Oct. 13, 1959   G. A. DOMENECH ET AL   2,908,059
FASTENING DEVICES
Filed March 19, 1958                4 Sheets-Sheet 1

INVENTOR
G. ANGLADA DOMENECH &
V. ANGLADA DOMENECH

BY *J. Harold Kilcoyne*
ATTORNEY

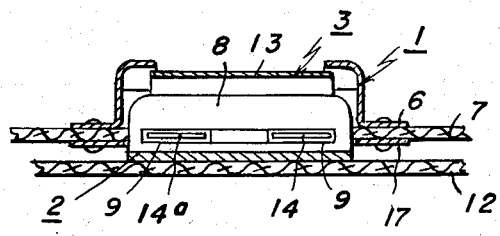
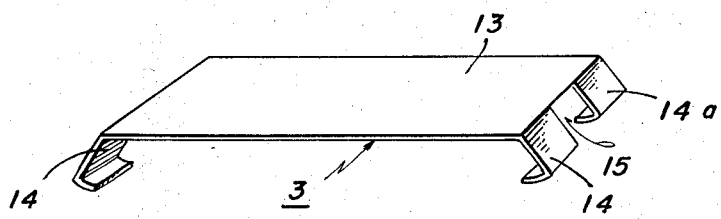
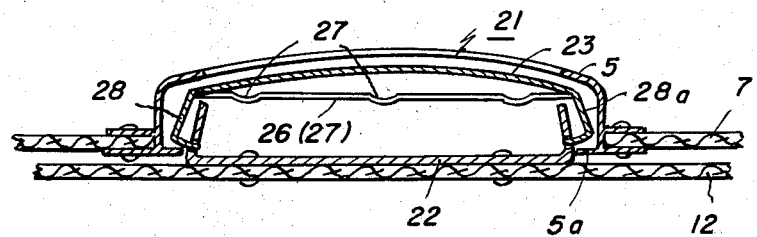
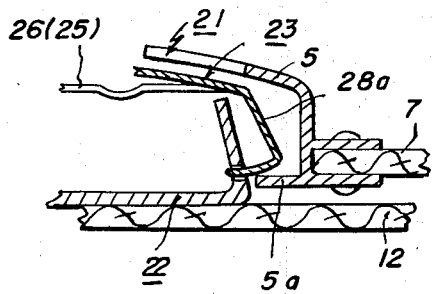
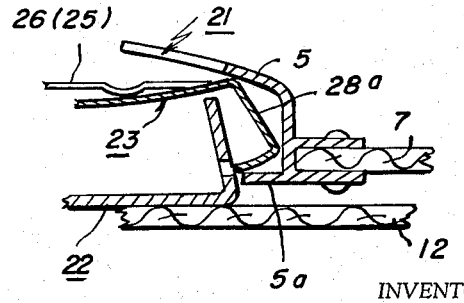

Oct. 13, 1959  G. A. DOMENECH ET AL  2,908,059
FASTENING DEVICES
Filed March 19, 1958  4 Sheets-Sheet 4

INVENTORS
G. ANGLADA DOMENECH &
V. ANGLADA DOMENECH
BY
ATTORNEY

United States Patent Office 2,908,059
Patented Oct. 13, 1959

2,908,059
FASTENING DEVICES

Gerardo Anglada Domenech and Vicente Anglada Domenech, Barcelona, Spain, assignors to Waldes Kohinoor, Inc., Long Island City, N.Y., a corporation of New York Application March 19, 1958, Serial No. 722,470

10 Claims. (Cl. 24—217)

This invention relates to improvements in fastening devices of the general type disclosed and claimed in our Patent No. 2,816,340, granted December 17, 1957.

Such a fastening device comprises an outer casing constituting the female element of the fastener and which is attachable to one of the members to be fastened, a stud-like male element adapted to be attached to the other member to be fastened and having a circular groove or depression in its side wall, and a resilient clamp element contained in the casing and comprising an arched or part-spherical elastic disc adapted to assume either a stable convex position or a stable concave position, and being provided along its peripheral portion with depending clamping fingers which as a function of disc reversal are projected into the side groove of the stud member thereby to secure it to the casing or are retracted from the stud groove thereby to release the stud.

An analysis of the aforesaid resilient clamp element reveals that it combines into a single device a plurality of different instrumentalities. That is to say, it combines the following: An arched part, herein for convenience termed a "reversible part," which, by reversing shape, assumes two stable positions; elastic means which endows said part with the requisite elasticity enabling it to change from one to the other of its positions as aforesaid; contracting means which provides for the reversible part being contracted when external pressure is applied to bring about the change from one position to another; and gripping means connected to the peripheral portion of the reversible part in such manner that they exercise their stud-gripping and releasing action as a function of reversal of said reversible part.

It will of course be understood that in the resilient clamp element according to our aforesaid Patent No. 2,816,340 there is actually no separate means of contraction, since such is provided by the peripheral portion extending about the arched disc portion of said element and merging into the arched disc proper, so that its contraction is no more than an effect of the elastic reaction of the material making up said arched disc. Similarly, the aforesaid elastic means feature of the resilient clamp element is also provided by the inherent elasticity of the spring material making up the arched disc as enables it to contract when concentrically compressed and thereupon to expand in assuming the opposite stable shape.

The present invention also relates to a fastening device employing a shape-reversing resilient clamp means for releasably securing a stud-like male element within a casing-form female element comprising a reversible part capable of assuming two stable positions and associated elastic means, contracting means and gripping means as aforesaid, and its broad object is to structurally simplify and to improve the resilient clamp means of such a fastening device.

More particularly, an object of the present invention is the provision of a rigid stud and resilient socket type of fastening device wherein the female or socket element is enabled to function as a resilient socket through the incorporation therein of resilient clamp means having a shape-reversing part operating generally similar to that of our aforesaid prior Patent No. 2,816,340, but which is characterized in that the means for contracting said reversible part is at least partially separate from said part.

According to one main form of resilient clamp means of the present invention, the part functioning as the reversible part of said clamp means is supplied with the potential of reversing its shape by contracting it endwise to the extent that it assumes bowed configuration, in which it is either convexly or concavely stable, by contracting means which are physically separate from said part. In this form of the invention, two main embodiments of the means for contracting said parts are contemplated. Accordingto one such embodiment wherein the reversible part consists of a simple rectangular sheet of spring metal, the contracting means comprises a pair of abutments spaced from one another a distance which is less than the length of said sheet whereby, when the latter is assembled to the abutments, it necessarily takes on bowed configuration as endows it with the property of assuming two stable positions. According to the other embodiment, the reversible part and the means for contracting the same are fabricated from an initially rectangular spring-metal sheet which is provided with slits adjacent its longer edges so as to provide side-edge portions, and such side edge portions are shortened whereby to bow the intermediate portion of the sheet which then makes up the reversible part.

Likewise, according to the first form of the invention under discussion, and as respects the elastic means component of the clamp, the invention provides three embodiments of elastic means as follows: (a) wherein the reversible part consists of a simple plate or sheet of spring metal which is flexible and elastic throughout, whereby it embodies the elastic means enabling it to change to one or the other positions; (b) wherein the reversible part consists of a single plate or sheet of spring metal and such is provided with a crosswise formation or formations which render it substantially more elastic than the corresponding sheet or plate without said formations; and (c) wherein the reversible part is of sectional construction and a spring or similar element is positioned between said sections so as to be compressed thereby as said sections swing relatively towards one another.

According to a second main form of resilient clamp means of the present invention, the elastic means which leads to the reversible part moving to one or the other of its two stable positions is physically separate from the reversible part and it also functions as the means for contracting said reversible part which gives it the potential to reverse its position as aforesaid.

The above stated and other objects and features of advantage of the invention will appear from the following detailed description thereof, in which reference is had to the accompanying illustrative drawings, wherein—

Fig. 5 is a section taken along line V—V of Fig. 1;

Fig. 6 is a perspective view of the resilient clamp means employed in the fastening device of the prior views, the reversible part of which is shown in the unstressed position;

Figs. 7, 8 and 9 are views corresponding generally to Figs. 2, 3 and 4, which illustrate a variant of the form of fastening device illustrated in Figs. 1–6;

Figure 13:
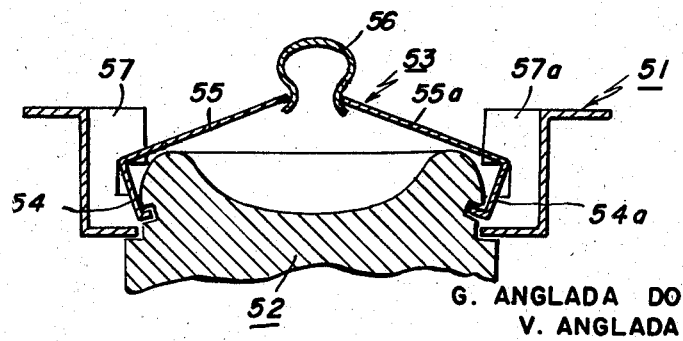
Figure 14:
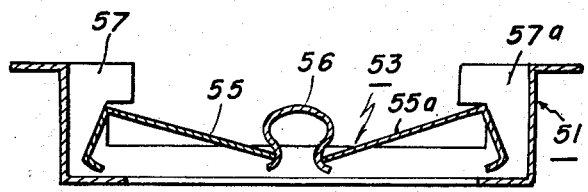
Figure 15:
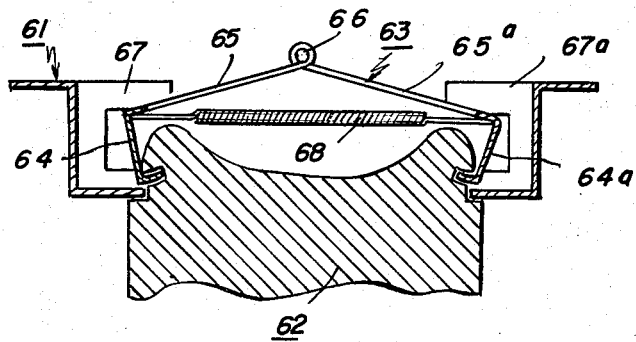
Figure 16:
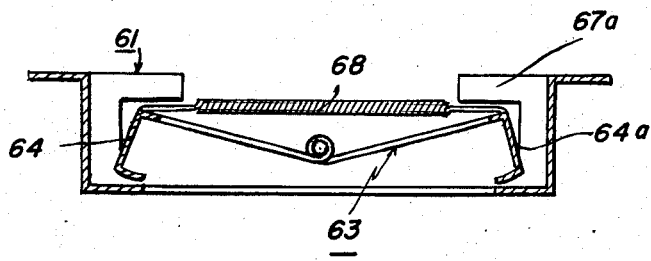

Figs. 13 and 14 are somewhat diagrammatic views illustrating yet another variant of the main form of fastening device; and Figs. 15 and 16 are diagrammatic views similar to Figs. 13 and 14, respectively, intended to illustrate another main form of resilient clamp means employing a reversible part as aforesaid, wherein the elastic means and contracting means associated with the reversible part are merged into a single means functioning as an over-center spring.

Figure 1:
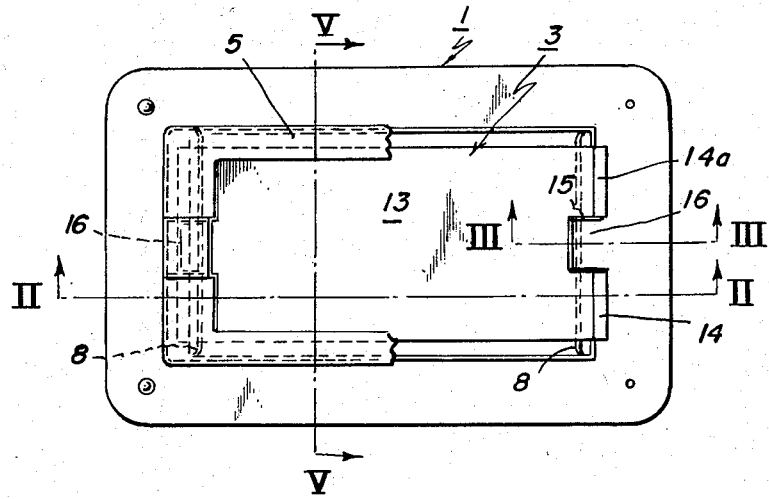
Fig. 1 is a plan view of one form of fastening device according to the invention shown as operational, a portion of the casing element thereof being omitted from the right half of the view to show the fastener parts covered thereby.

Referring to the drawings in detail and using, in so far as possible, the same descriptive terminology employed in our aforesaid Patent No. 2,816,340, reference numeral 1 designates the so-called casing constituting the female element, reference numeral 2 generally designates the male or stud element, and reference numeral 3 generally designates the resilient clamp element of one form of fastening device according to the invention. As best seen in Fig. 1, all three of said elements have generally elongate, i.e. rectangular configuration and interfitting relationship. Preferably, the casing is fashioned as a frame having a marginal front flange 5 which frames the resilient clamp element 3 and a marginal bottom flange 6 by which the casing may be attached as by rivets to one of the members 7 to be fastened; and the stud element 2 is of channel section having upright side (end) walls 8 provided with outwardly opening recesses or slots 9 located near their lower ends, the base or cross part of said element being attachable as by rivets to the other member 12 to be fastened, it being understood that the stud element is dimensioned so as to be insertible into the casing interior wherein it is accommodated with suitable clearance between its upright side walls 8 and the corresponding end walls of the casing.

The resilient clamp element 3 employed in the form of fastening device under description is shown in its unstressed state in Fig. 6. More particularly, it comprises a rectangular sheet or plate 13 of spring metal having a vertical (height) dimension which is somewhat less than the corresponding dimension of the frame-like casing 1 and a horizontal (width) dimension which is somewhat greater than the corresponding width dimension of said casing. Along both its shorter side or end edges which define its opposite ends, the plate 13 is formed with clamping fingers 14, 14a (two such fingers per side edge being shown) which are spaced as by a gap or notch 15. According to the instant form of fastening device, the plate 13 is contracted endwise ( widthwise as seen in Fig. 1) so that it assumes bowed configuration.

Figure 3:
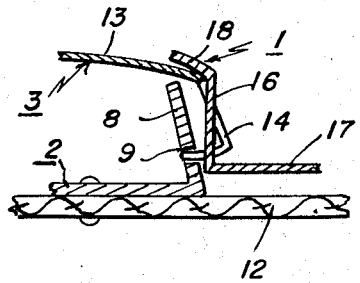
Fig. 3 is a fragmentary sectional detail taken generally along line III—III of Fig. 1.
Figure 4:
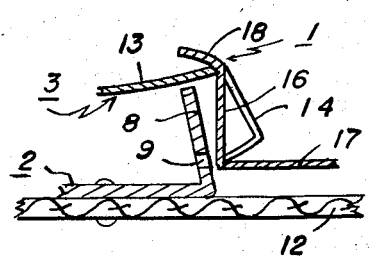
Fig. 4 is a fragmentary sectional detail similar to Fig. 3 illustrating resilient clamp means in its fastener releasing position.
Figure 10:
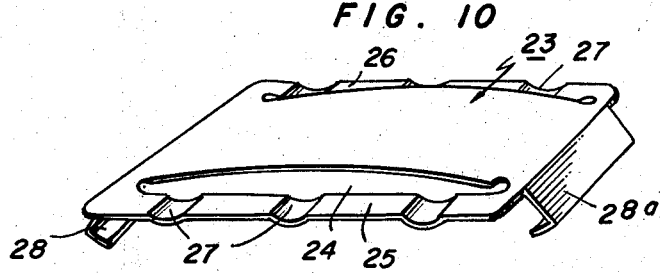
Fig. 10 is a perspective view of the reversible resilient clamp means embodied in the Figs. 7–9 modification.

Illustratively, the means for contracting said plate comprises a pair of abutment arms 16 which preferably are formed integral with and extend upwardly from a flange 17 affixed to the under face of the member 7 to be fastened (to which the casing 1 is attached), and preferably by the same rivets which secure the bottom casing flange 6 to said member. The upper terminals 18 of said arms 16 extend towards one another at an obtuse angle with the arms, from which they extend, and thus their upper ends define facing plate-retaining hooks or claws whose action is shown in Figs. 3 and 4. The spacing between the inner faces of the abutment arms 16 is less than the longer (width) dimension of the plate 13 so that when the latter is assembled to the casing with its end edges engaging the arms in the corners between said arms and their terminals 18, the plate is bowed a predetermined amount and assumes a stable convex or a stable concave position, from either of which it is reversible to the opposite position, thus to function similar to the arched reversible disc or part of our aforesaid Patent No. 2,816,340. Consequent to the plate 13, which on assembly becomes a reversible part as aforesaid, being made of spring metal and being always in compression, it will be seen that said plate or reversible part incorporates its own elastic means just as does the aforesaid arched disc.

Figure 2:
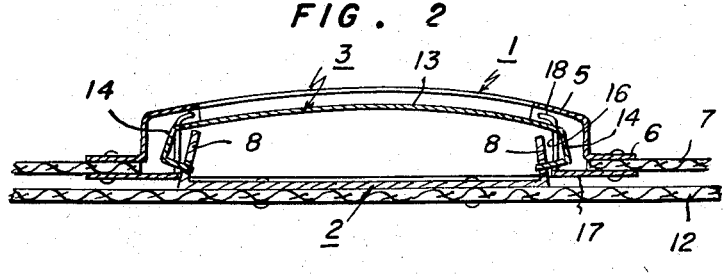
Fig. 2 is a section taken along line II—II of Fig. 1.

While the operation of the illustrated device will be apparent from the drawings, such as briefly detailed as follows: Referring to Figs. 2 and 3 which show the fastener to be operational, it will be observed that the stud element 2 is secured within the casing 1 by the clamping fingers 14 and 14a which have been projected into the slots or recesses 9 of the stud-element side walls 8 consequent to movement of the plate from its previously stable concave position to its stable convex position which will be assumed to have taken place, the clamping fingers being of course maintained in their locking position so long as the reversible part 13 is in its aforesaid stable convex position. When it is desired to break or open the fastener, finger pressure is exerted on the upper convex face of the reversible part 13 which is of course accessible through the top of the frame-like casing 1, such resulting in the part moving to its stable concave position in which it is partly shown in Fig. 4. As a function of such reversal, the opposite end-edge portions of the part undergo a slight change in inclination, which causes a co-relative movement of the clamping fingers 14, 14a outwardly or to their release position shown in Fig. 4, whereupon the stud element may be freely withdrawn from the casing.

It will also be understood from Fig. 4 that to complete the fastener it is necessary only to insert the stud element 2 into the opening of the casing element 1 from below and thereupon to manually press said elements together, as results in the top edges of the stud-element side walls 8 pushing against the under face of the reversible part 13 inwardly from its end edges, which latter are positively held in the corners between the abutment arms 16 and their terminals 18, as causes said part to reverse its position and assume the stable convex position, with movement of the grip fingers 14, 14a to their locking position being a function of such reversal.

Figs. 7–10 illustrate a variant construction according to which the means for contracting the reversible part, while in a sense being integral with, is nonetheless physically and functionally separate from the reversible part proper which is generally designated 23. In explanation, a relatively rectangular spring-metal plate constituting the starting blank for the reversible part 23 is in fabrication of said part provided along its top and bottom edges with parallel slits 24, such resulting in the blank up to this stage having side edge portions 25, 26 and an intermediate body portion. Thereupon, the horizontal length (Fig. 10) dimension of these side edge portions 25, 26 is decreased as compared to that of said intermediate portion of the blank as by impressing a plurality of transverse corrugations 27 therein. Such results in the intermediate portion of the blank being contracted endwise so that it forms the reversible part 23 comparing in all substantial respects with the aforesaid reversible part 13 and which is accordingly capable of assuming stable bowed configurations, either convex or concave. The fabrication of the blank is also such as to provide the ends of said reversible part (but not the corresponding ends of the side-edge portions 25, 26) with depending clamping fingers 28, 28a which are projected inwardly and outwardly as a function of the reversal of the part 27.

By reference to Figs. 8 and 9, it will be seen that the variant reversible part 23 may be assembled in place in the frame-like casing element 21 simply by inserting the clamping finger ends thereof into the end spaces of the casing provided by the conventional top flange 5 thereof and an inwardly directed companion bottom flange 5a. When so positioned with respect to both the casing 21 and the stud element 22, upon the latter being inserted into the casing, the clamping fingers 28 are adapted to move inwardly into and to retract outwardly from the recesses or holes provided in the upright side walls of the stud element as a function of the reversal of said part 23 as with the prior described form of fastening device. Also to be observed from Figs. 8 and 9 is that the casing element 21 is devoid of abutment arms corresponding to the arms 16, 18 as previously decribed, since there exists no need for same when the contracting means are formed by the side-edge portions of the resilient clamp element as explained above. It will be appreciated also that, similarly to the reversible part 13 of the resilient clamp element 3 incorporating its elastic means making reversal of said part possible, the reversible part 23 of the Figs. 7–10 form of resilient clamp element also inherently incorporates the elastic means enabling said part 23 to reverse.

According to a further feature of the invention, the simple rectangular plate-form type of reversible part 13 shown in Fig. 6 may be endowed with increased elasticity than is normally possessed by said part due to its fabrication from spring metal plus that resulting from its bowing as aforesaid. For example, and referring to Fig. 11 which illustrates a resilient clamp element 33 corresponding generally to that illustrated in Fig. 6, it will be seen that the reversible part thereof which has resilient clamping fingers 34, 34a corresponding to the similar clamping fingers 14, 14a shown in Fig. 6, is formed with a single deep corrugation 35 extending transversely thereof intermediate its ends, and the same effect is achieved in the Fig. 12 form of resilient clamp element 43 by a plurality of corrugations 45 extending transversely across its reversible part.

Figure 11:
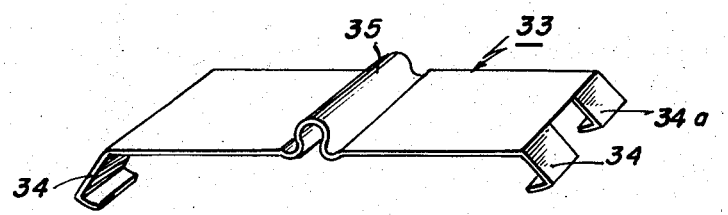
Figs. 11 and 12 illustrate modified forms of reversible resilient clamp means which incorporate provision for increasing the elasticity thereof.
Figure 12:
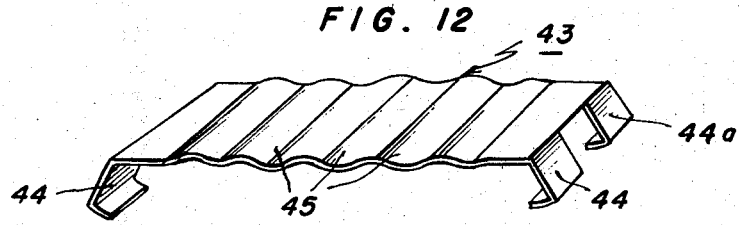

A structurally different yet functionally similar variant of resilient clamp element incorporating separate elastic means generally corresponding to the elastic means 35 of the Fig. 11 form of resilient clamp element is illustrated in Fig. 13. According thereto, the resilient clamp element generally designed 53 is constituted by two rigid end sections 55, 55a whose inner adjacent edges compress between them a spring 56 of omega-shaped section which extends transversely across said element. The remote edges of said sections which form the opposite ends of said clamp element mount depending clamping fingers 54, 54a (corresponding generally to the aforesaid gripping fingers 14, 14a, etc.) and said remote edges are also held against relative spreading by oppositely acting fixed abutments 57, 57a which extend inwardly from the end (side) walls of the frame-like casing element 51 (corresponding to the casing element 1, etc.). The distance between said abutments 57, 57a is less than the overall width taken up by the rigid end sections 55, 55a and the intermediate spring 56, and accordingly the sections incline by a small angle in opposite directions with respect to one another. By proper dimensioning, the sections and spring constitute a reversible part functioning as the aforesaid reversible part 13, for example, to grip and release the stud element 52 of the fastener as a function of reversal of said part, but which is characterized in that the elastic means, i.e. the compressible spring 56, is separate from both the reversible part and from the means for contracting said reversible part.

The aforesaid rigid-section reversible part feature of the Figs. 13 and 14 variant may also be employed in a second main form of resilient clamp element illustrated in Figs. 15 and 16. Such clamp element generally designated 63 is made up of the rigid end sections 65, 65a which are hinged together along adjacent edges by means of a hinge 66 and whose remote edges (which carry the now familiar clamping fingers 64, 64a) are guided and held against spreading during section reversal by overhanging abutments 67, 67a mounted in the casing element 61. The form of resilient clamp element under description is characterized principally by the fact that the means for providing the reversible part of the element with elasticity and for contracting it as are necessary to enable it to partake of its reversal movement are combined into a single spring 68 functioning as an over-center spring. That is to say, the spring is connected to the remote edges of the sections 65, 65a in such manner that is supplies the requisite elasticity to the element as a whole and further tend to contract the device so that it moves to and holds the position to which it is actuated, i.e. the stable convex or the stable concave position.

Without further analysis, it will be appreciated that a fastening device in the forms and variants thereof as described above and illustrated in the accompanying drawings fulfills in simple and effective manner the objectives of the invention as outlined in the foregoing. However, it will be understood that as the drawings are merely of an illustrative nature, they should be interpreted as wholly non-restrictive in respects to the scope of the invention as defined by the following claims.

We claim:

1. A fastening device comprising, in combination, male and female fastener elements each attachable to a member to be fastened, the female element comprising a generally elongated frame-like casing and the male element being insertable in said casing and comprising a rigid stud having a pair of upright end walls provided with outwardly facing recesses, and resilient clamp means contained within the casing for releasably clamping the stud to the casing following its insertion thereinto, said means comprising an elongate part having an edge configuration conforming generally to that of the frame-like casing and extending substantially the length of said casing and being in a state of endwise contraction whereby it possesses the potential of reversing from a stable convex to a stable concave configuration, and vice versa, clamping fingers depending from the opposite ends only of said part and being projectable into and retractible from the stud recesses with reversal of said part, elastic means associated with said elongate part rendering it capable of reversal as aforesaid, and contracting means operative between said opposite ends only of the elongate part for placing the said part in a state of endwise contraction whereby to condition it for reversal.

2. A fastening device substantially as set forth in claim 1, wherein said contracting means comprise abutment arms on the casing which engage the ends of said elongate part, said abutment arms being spaced apart a predetermined fixed distance which is less than the length of said part.

3. A fastening device substantially as set forth in claim 1, wherein said contracting means comprise side edge portions on said part which are connected thereto at corresponding ends but are separated from said part along both its side edge portions by slits, the length of said side edge portions being less than the length of said reversible part whereby they draw the ends of said part together, thereby to bow the latter.

4. A fastening device substantially as set forth in claim 1, wherein said contracting means comprise side edge portions on said part which are connected thereto at corresponding ends but are separated from said part along both its side edge portions by slits, and wherein said side edge portions are provided with transverse corrugations which effectively shorten same as compared to the intermediate part thereby to bow the latter.

5. A fastening device substantially as set forth in claim 1, wherein said elastic means comprises the elastic material from which said part is fashioned.

6. A fastening device substantially as set forth in claim 1, wherein said elastic means comprises the elastic material from which said part is fashioned and at least a single corrugation formed in and extending transversely across said part and being constructed and arranged as to impart additional elasticity thereto.

7. A fastening device substantially as set forth in claim 1, wherein said elastic means include at least one corrugation formed in and extending across said part and imparting elasticity thereto, and wherein said contracting means comprise abutment arms on the casing engaging the ends of said reversible part and being spaced a fixed distance apart which is less than the length of said part.

8. A fastening device substantially as set forth in claim 1, wherein said elongate part comprises two rigid end sections spaced apart along adjacent edges and an intermediate compressible member extending transversely across said part and which constitutes the entire elastic means as aforesaid, and wherein said contracting means comprise fixed abutments engaging the opposite ends of the sections and which are spaced apart a predetermined distance less than the total length of said part sections and said intermediate compressible member, whereby said sections normally assume opposite inclinations.

9. A fastening device substantially as set forth in claim 1, wherein said elongate part comprises two rigid end sections, hinge means hingedly connecting said sections on a line extending across said part midway thereof, abutment means operatively engaging the opposite ends of said sections and being spaced apart a fixed predetermined distance which is less than the total length of said part, and unitary spring means constituting both the elastic means and the contracting means as aforesaid.

10. A fastening device substantially as set forth in claim 9, wherein said unitary spring means comprises an over-center coil spring connected to said opposite ends of the part sections.

References Cited in the file of this patent

UNITED STATES PATENTS 2,816,340     Domenech             Dec. 17, 1957